(12) United States Patent
Bain

(10) Patent No.: US 10,954,001 B2
(45) Date of Patent: Mar. 23, 2021

(54) HANGING CLAMPED SUPPORTS FOR AIRCRAFT

(71) Applicant: The Boeing Company, Chicago, IL (US)

(72) Inventor: Richard James Bain, Camberwell (AU)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 15/816,967

(22) Filed: Nov. 17, 2017

(65) Prior Publication Data

US 2018/0237167 A1 Aug. 23, 2018

Related U.S. Application Data

(63) Continuation-in-part of application No. 15/441,082, filed on Feb. 23, 2017, now Pat. No. 10,445,873.

(51) Int. Cl.
*B64F 5/10* (2017.01)
*B64F 5/60* (2017.01)
(Continued)

(52) U.S. Cl.
CPC .............. *B64F 5/60* (2017.01); *B64F 5/10* (2017.01); *F16B 2/065* (2013.01); *F16M 11/046* (2013.01);
(Continued)

(58) Field of Classification Search
CPC ... B64F 5/10; B64F 5/60; F16B 2/065; F16M 11/046; F16M 13/022; G01N 21/01; G01N 21/95; G05B 19/41805; G05B 19/41865; G05B 19/41875; G05B 2219/32177; G05B 2219/32252; Y02P 90/04; Y02P 90/22

See application file for complete search history.

(56) References Cited

U.S. PATENT DOCUMENTS 2,470,991 A * 5/1949 Kindorf .................... F16L 3/24
                                                                    248/72
2,638,063 A * 5/1953 Clark .................... B60P 7/0815
                                                                    410/101

(Continued)

FOREIGN PATENT DOCUMENTS

EP 0369891 A2 5/1990
EP 2204710 A1 7/2010

(Continued)

OTHER PUBLICATIONS

Quick Release Clamp w/ detent pin. Product Description [online]. Acratech Corporation, Jan. 10, 2016 [retrieved on Nov. 6, 2019]. Retrieved from the Internet: <URL: https://web.archive.org/web/20160110133948/https://www.acratech.net/quick-release-clamps/quick-release-clamp-w-detent-pin>. (Year: 2016).*

(Continued)

Primary Examiner — Jacob J Cigna
(74) Attorney, Agent, or Firm — Duft & Bornsen, PC

(57) ABSTRACT

Systems and methods are provided for hanging inspection systems for aircraft from floor beams of those aircraft. One embodiment is a method that includes selecting a floor beam of an aircraft, attaching a hanging support to a floor beam, and placing an inspection system at a mount of the hanging support.

20 Claims, 12 Drawing Sheets

(51) Int. Cl.
*F16B 2/06* (2006.01)
*F16M 11/04* (2006.01)
*F16M 13/02* (2006.01)
*G01N 21/01* (2006.01)
*G01N 21/95* (2006.01)
*G05B 19/418* (2006.01)

(52) U.S. Cl.
CPC ........... *F16M 13/022* (2013.01); *G01N 21/01* (2013.01); *G01N 21/95* (2013.01); *G05B 19/41805* (2013.01); *G05B 19/41875* (2013.01); *G05B 2219/32177* (2013.01); *Y02P 90/02* (2015.11)

(56) References Cited

U.S. PATENT DOCUMENTS

| | | | | |
|---|---|---|---|---|
| 2,675,201 | A * | 4/1954 | Friel | F16L 3/24 248/228.3 |
| 2,919,098 | A * | 12/1959 | Mull | F21V 21/15 248/324 |
| 3,140,848 | A * | 7/1964 | Sherburne | F16L 3/24 248/72 |
| 3,232,393 | A * | 2/1966 | Attwood | E04B 1/38 403/387 |
| 3,292,888 | A * | 12/1966 | Fischer | H02G 3/263 248/72 |
| 4,019,705 | A * | 4/1977 | Habuda, Sr. | F16L 3/11 248/58 |
| 4,197,573 | A * | 4/1980 | Thatch | F21L 14/00 362/241 |
| 4,270,721 | A * | 6/1981 | Mainor, Jr. | G01C 15/00 248/228.6 |
| 4,700,917 | A * | 10/1987 | Dillman | F16B 2/065 248/222.14 |
| 5,897,088 | A * | 4/1999 | Kirschner | F16B 2/02 248/300 |
| 5,947,424 | A * | 9/1999 | Heath | F16B 21/16 248/228.1 |
| 6,334,285 | B1 * | 1/2002 | Kirschner | E04B 9/18 248/228.1 |
| 6,398,175 | B1 * | 6/2002 | Conner | B25B 1/2405 248/228.3 |
| 6,636,581 | B2 * | 10/2003 | Sorenson | G01N 23/04 378/58 |
| 6,898,905 | B1 * | 5/2005 | Kirschner | F16B 2/065 248/228.5 |
| 7,414,704 | B1 * | 8/2008 | Nau | G01C 15/006 356/4.08 |
| 7,499,772 | B2 * | 3/2009 | Wilcox | G01N 29/225 701/3 |
| 8,100,369 | B2 * | 1/2012 | Osborn | F16B 2/065 248/228.1 |
| 8,534,625 | B2 * | 9/2013 | Heath | F16B 2/065 138/106 |
| 8,561,952 | B2 * | 10/2013 | Pfeiler | F16M 11/045 248/187.1 |
| 8,584,995 | B2 * | 11/2013 | Russell | F16M 11/242 248/163.1 |
| 8,873,891 | B2 | 10/2014 | Boncyk et al. | |
| 9,242,615 | B2 | 1/2016 | Adams et al. | |
| 9,272,373 | B2 * | 3/2016 | Meyer | G01C 15/02 |
| 9,376,079 | B2 | 6/2016 | Adams et al. | |
| 9,513,121 | B2 * | 12/2016 | Kallabis | G01C 15/006 |
| 9,518,697 | B1 * | 12/2016 | Weigel | F16M 13/022 |
| 9,607,236 | B1 | 3/2017 | Wilbert et al. | |
| 9,677,585 | B2 * | 6/2017 | Broussard | F16B 7/0493 |
| 9,704,237 | B2 | 7/2017 | Kraki et al. | |
| 9,779,318 | B1 | 10/2017 | Wilbert et al. | |
| 9,903,791 | B2 | 2/2018 | Charlat et al. | |
| 9,959,838 | B2 | 5/2018 | Nagata | |
| 10,035,594 | B2 | 7/2018 | Myslinski | |
| 10,035,595 | B2 | 7/2018 | Myslinski | |
| 10,175,146 | B2 | 1/2019 | Braghiroli et al. | |
| 2002/0128790 | A1 | 9/2002 | Woodmansee | |
| 2003/0043964 | A1 * | 3/2003 | Sorenson | G01N 23/04 378/58 |
| 2003/0227470 | A1 | 12/2003 | Genc et al. | |
| 2008/0077511 | A1 | 3/2008 | Zimmerman | |
| 2008/0078129 | A1 * | 4/2008 | Wood | B64C 1/068 52/127.1 |
| 2008/0310754 | A1 | 12/2008 | Safai et al. | |
| 2010/0161100 | A1 | 6/2010 | Crothers et al. | |
| 2010/0235037 | A1 | 9/2010 | Vian et al. | |
| 2012/0037763 | A1 * | 2/2012 | Guthke | F16L 3/24 248/65 |
| 2012/0136630 | A1 | 5/2012 | Murphy et al. | |
| 2012/0256072 | A1 * | 10/2012 | Russell | H04R 1/026 248/339 |
| 2012/0265416 | A1 | 10/2012 | Lu et al. | |
| 2012/0303336 | A1 | 11/2012 | Becker et al. | |
| 2012/0305723 | A1 * | 12/2012 | Heath | F16B 2/065 248/228.1 |
| 2014/0270466 | A1 | 9/2014 | Dam et al. | |
| 2014/0306799 | A1 | 10/2014 | Ricci | |
| 2014/0337733 | A1 | 11/2014 | Rodriguez et al. | |
| 2015/0012171 | A1 | 1/2015 | Richter et al. | |
| 2015/0023602 | A1 | 1/2015 | Wnuk et al. | |
| 2015/0146015 | A1 * | 5/2015 | Sommerlade | G06F 3/0488 348/187 |
| 2015/0371443 | A1 * | 12/2015 | Troy | G06T 19/006 345/633 |
| 2016/0016312 | A1 | 1/2016 | Lawrence, III et al. | |
| 2016/0035037 | A1 | 2/2016 | Bulan et al. | |
| 2016/0040702 | A1 * | 2/2016 | Broussard | F16B 7/0493 248/201 |
| 2016/0075020 | A1 | 3/2016 | Szarski et al. | |
| 2016/0239013 | A1 * | 8/2016 | Troy | G05B 15/02 |
| 2016/0264089 | A1 | 9/2016 | Adams et al. | |
| 2016/0264262 | A1 | 9/2016 | Colin et al. | |

FOREIGN PATENT DOCUMENTS

| | | | |
|---|---|---|---|
| EP | 2937756 A1 | 10/2015 | |
| EP | 3045394 A1 | 7/2016 | |
| FR | 2945630 A1 | 11/2010 | |
| FR | 2964174 B1 * | 12/2016 | ............... F16B 2/12 |
| GB | 2468749 A * | 9/2010 | ............ G07C 5/008 |
| WO | 2014145471 A1 | 9/2014 | |

OTHER PUBLICATIONS

Machine Translation of FR-2964174-B1 (Year: 2016).*
U.S. Appl. No. 15/441,104.
Google.com, "i beam clamp," retrieved on Nov. 17, 2017, online at https://www.google.com.au/search?q=i+beam+clamp&client=firefox-b-ab&dcr=0&source=lnms&tbm=isch&sa=X&ved=0ahUKEwj-y66y2MTXAhVDp5QKHRM3A0gQ_AUICigB&biw=1344&bih=731.
European Search Report; Application EP17206759, dated Jun. 26, 2018.
European Search Report; Application EP17206765, dated Jul. 13, 2018.
Miljkovic et al; New hybrid vision-based control approach for automated guided vehicles; The International Journal of Advanced manufacturing Technology; Jul. 6, 2012; pp. 231-549, vol. 66, No. 1-4, springer, London, XP055484685.
European Office Action; Application 17206765.4, dated Apr. 3, 2020.

* cited by examiner

HANGING CLAMPED SUPPORTS FOR AIRCRAFT

FIELD

The disclosure relates to the field of mechanical supports.

BACKGROUND

During fabrication of an aircraft, it may be desirable to inspect the aircraft to ensure that fasteners, stringers, panels, and other components are placed in desired locations. However, inspection systems are often bulky, and must be placed at precise locations within an aircraft in order to provide valuable feedback for analysis. This process is complicated by the fact that an aircraft may be analyzed while it is still being fabricated. Thus, internal structural elements of the aircraft may be exposed. In some environments, there may not even be a floor of the aircraft yet in place.

The factors listed above complicate the process of precisely placing and/or mounting an inspection system, which in turn may result in the need for precise robotic placement systems to align the inspection system. When inspection systems must be placed by advanced robots instead of technicians, the cost of inspection increases. Hence, it is desirable to disrupt the production process as little as possible to accommodate inspections.

Therefore, it would be desirable to have a method and apparatus that take into account at least some of the issues discussed above, as well as other possible issues.

SUMMARY

Embodiments described herein provide an enhanced hanging clamped support that enables a technician to hang an inspection system for an aircraft from a floor beam (or other suitable structural feature) of an aircraft. The support holds an inspection system at a desired location relative to the floor beam from which the support hangs. The support also includes spring-loaded features that facilitate one-handed installation of the support by a technician. In further embodiments, the support may be designed such that the inspection system applies torque that facilitates clamping of the floor beam by the support. These hanging supports may take advantage of a small clearance between a top of a floor beam and a floor above the floor beam. While floor beams may vary in size depending on their position within a plane, the designs described herein may be suitable for many of those floor beams.

One embodiment is a method that includes selecting a floor beam of an aircraft, attaching a hanging support to a floor beam, and placing an inspection system at a mount of the hanging support.

A further embodiment is an apparatus that includes a hanging support. The hanging support includes a frame comprising multiple rigid members that are attached to each other, and an adjustable clamp affixed to an upper portion of the frame. The adjustable clamp includes a first assembly that is attached to the frame and that comprises a horizontal part having a planar lower surface, and a second assembly that comprises a rigid part and that displaces laterally from the horizontal part when the adjustable clamp is open. The hanging support also includes a rod that extends horizontally through the first assembly and the second assembly. One of the rigid members of the frame is attached to the first assembly and continues vertically below a vertical portion of the rigid part of the second assembly. The rigid member defines a rightward surface that is parallel with and faces a leftward surface of the rigid part of the second assembly.

A further embodiment is a system that includes a hanging support. The hanging support includes a frame comprising multiple rigid members that are attached to each other, and an adjustable clamp affixed to an upper portion of the frame. The adjustable clamp includes a first assembly that is attached to the frame and that comprises a horizontal part having a planar lower surface, and feet that protrude from the horizontal part perpendicular to an axial direction of the horizontal part. The feet have lower surfaces that are coplanar with the planar lower surface of the horizontal part. The adjustable clamp also includes a second assembly that comprises a rigid part and that displaces laterally from the horizontal part when the adjustable clamp is open. The rigid part includes an upper horizontal portion that contacts the first assembly when the adjustable clamp is closed, a vertical portion that protrudes downwards from the upper horizontal portion and defines a leftward surface, and a lower horizontal portion that protrudes horizontally from a lower end of the vertical portion towards the first assembly. The hanging support also includes a rod that extends horizontally through the first assembly and the second assembly. One of the rigid members of the frame is attached to the first assembly and continues vertically below the vertical portion of the rigid part of the second assembly, and the rigid member defines a rightward surface that is parallel with and faces the leftward surface of the rigid part of the second assembly.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
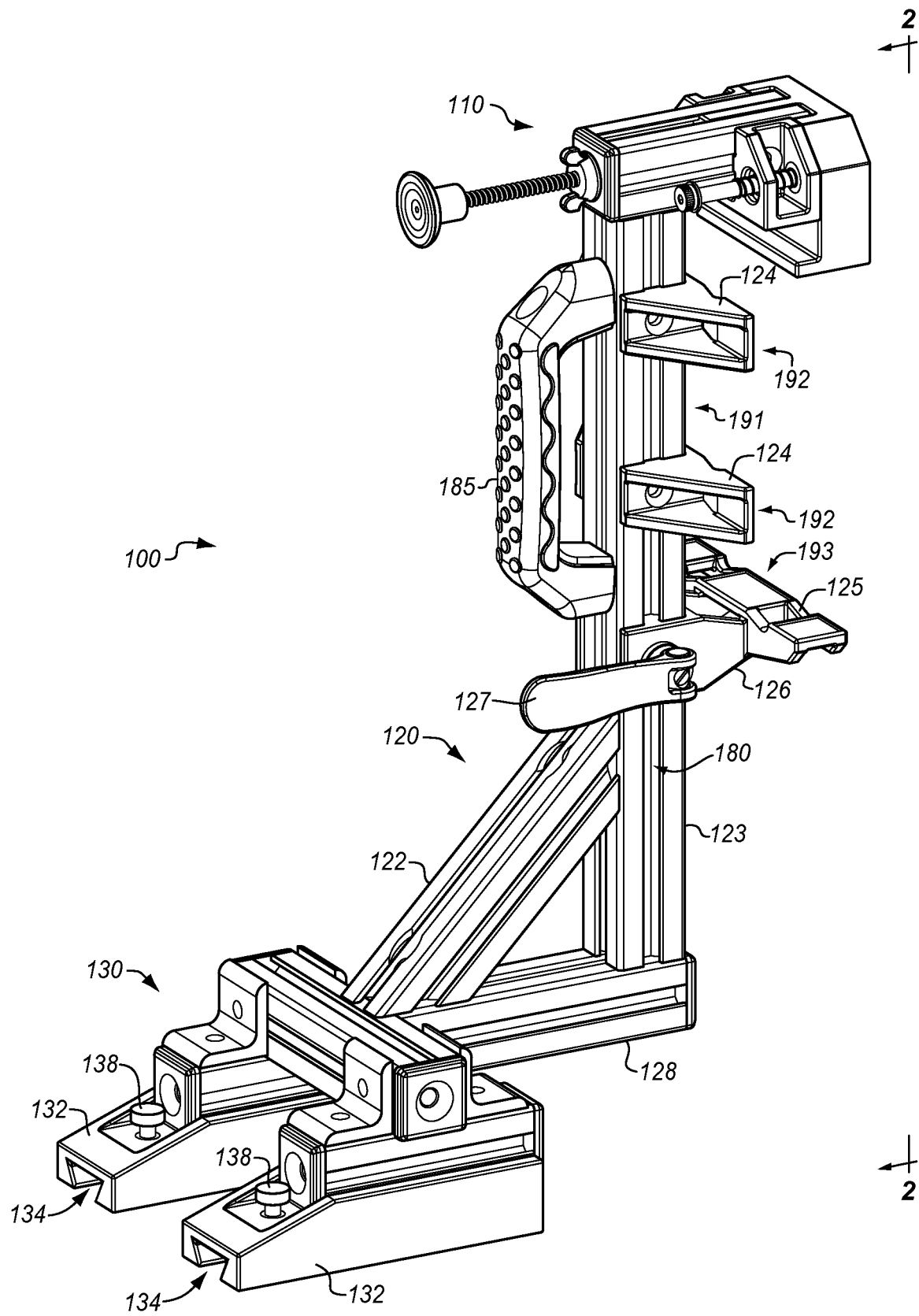
FIG. 1 is a perspective view of a hanging support in an illustrative embodiment.
Figure 2:
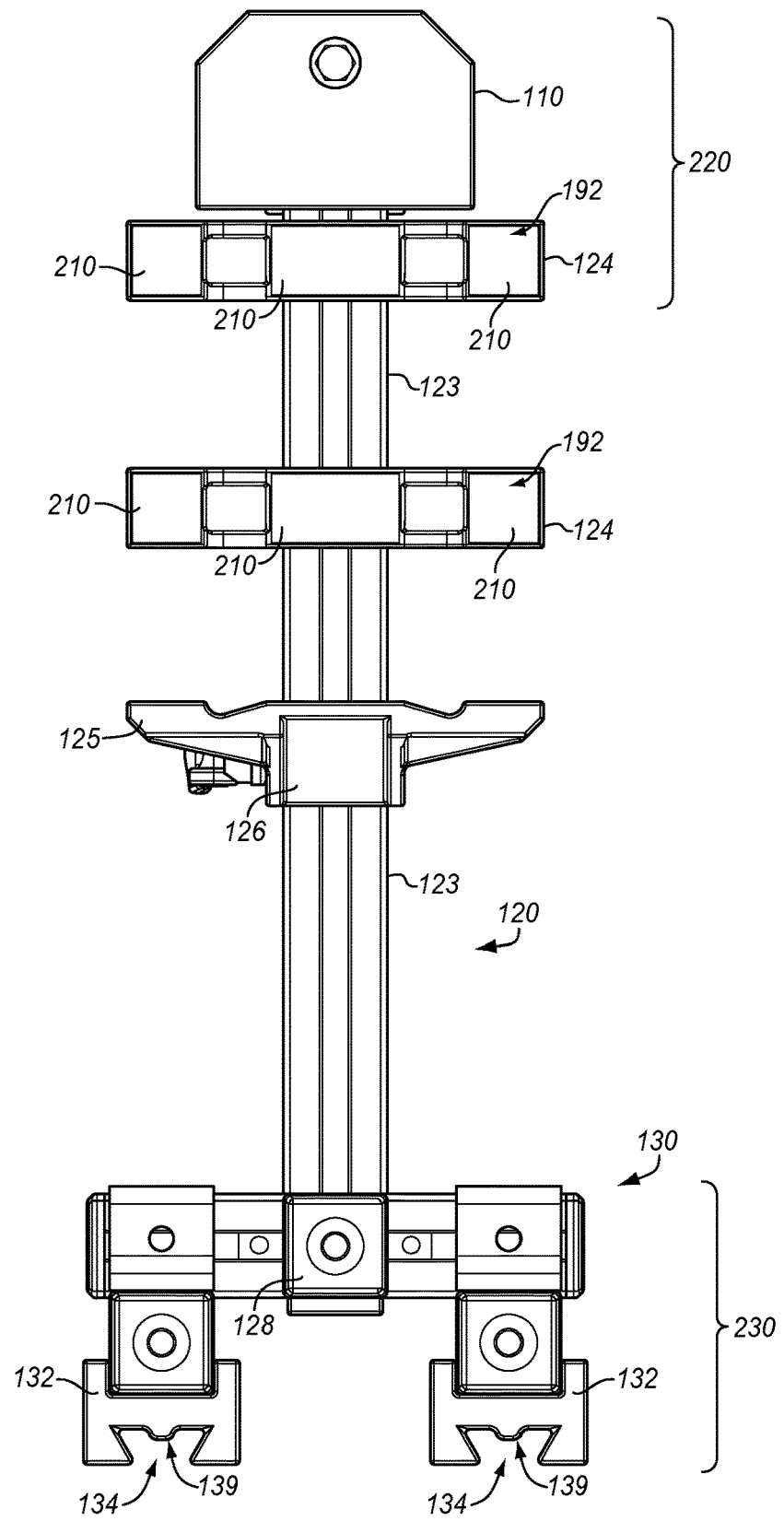
FIG. 2 is a front view of a hanging support in an illustrative embodiment.
Figure 3:
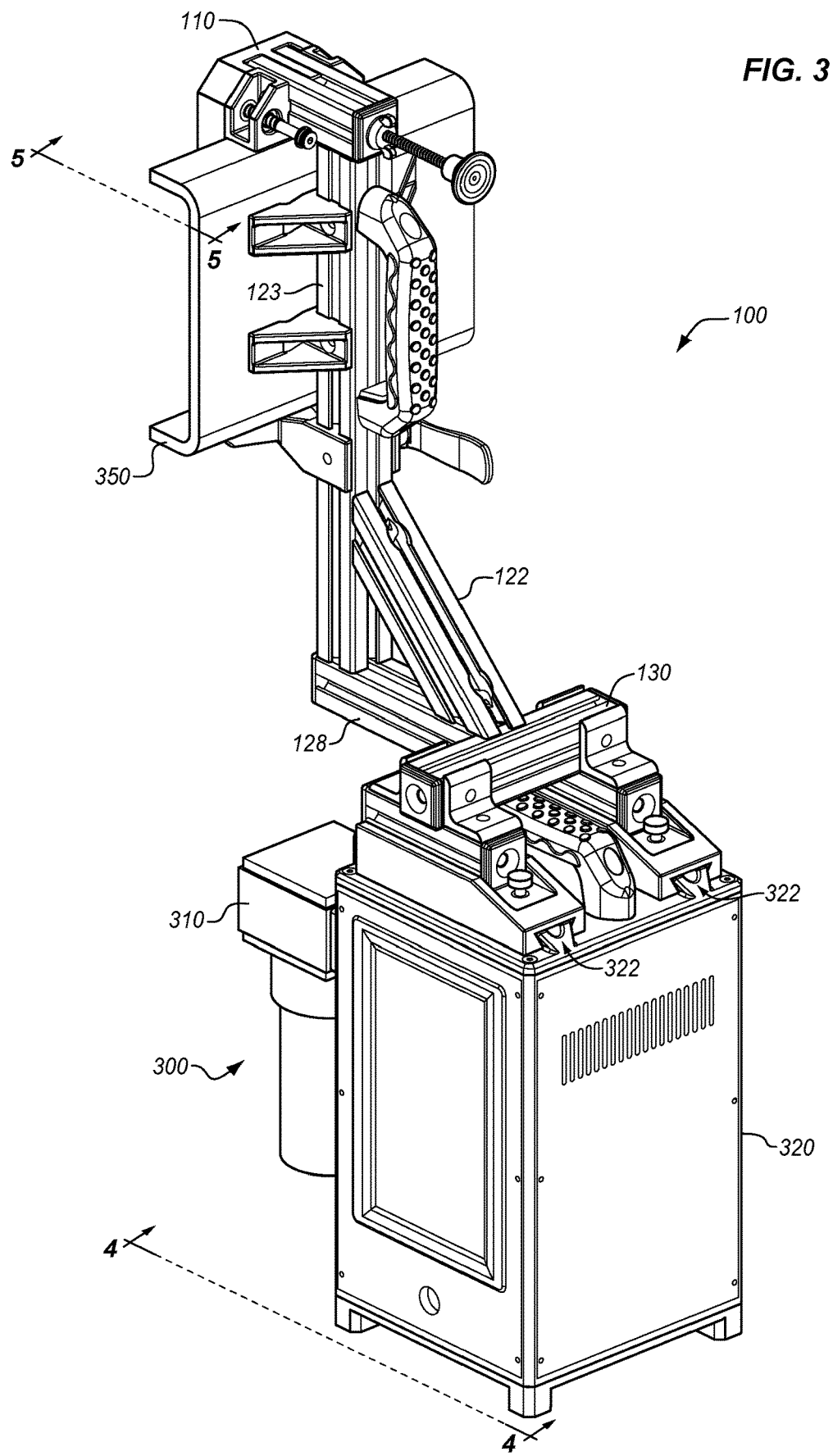
FIG. 3 is a perspective view of a hanging support bearing a load in an illustrative embodiment.
Figure 4:
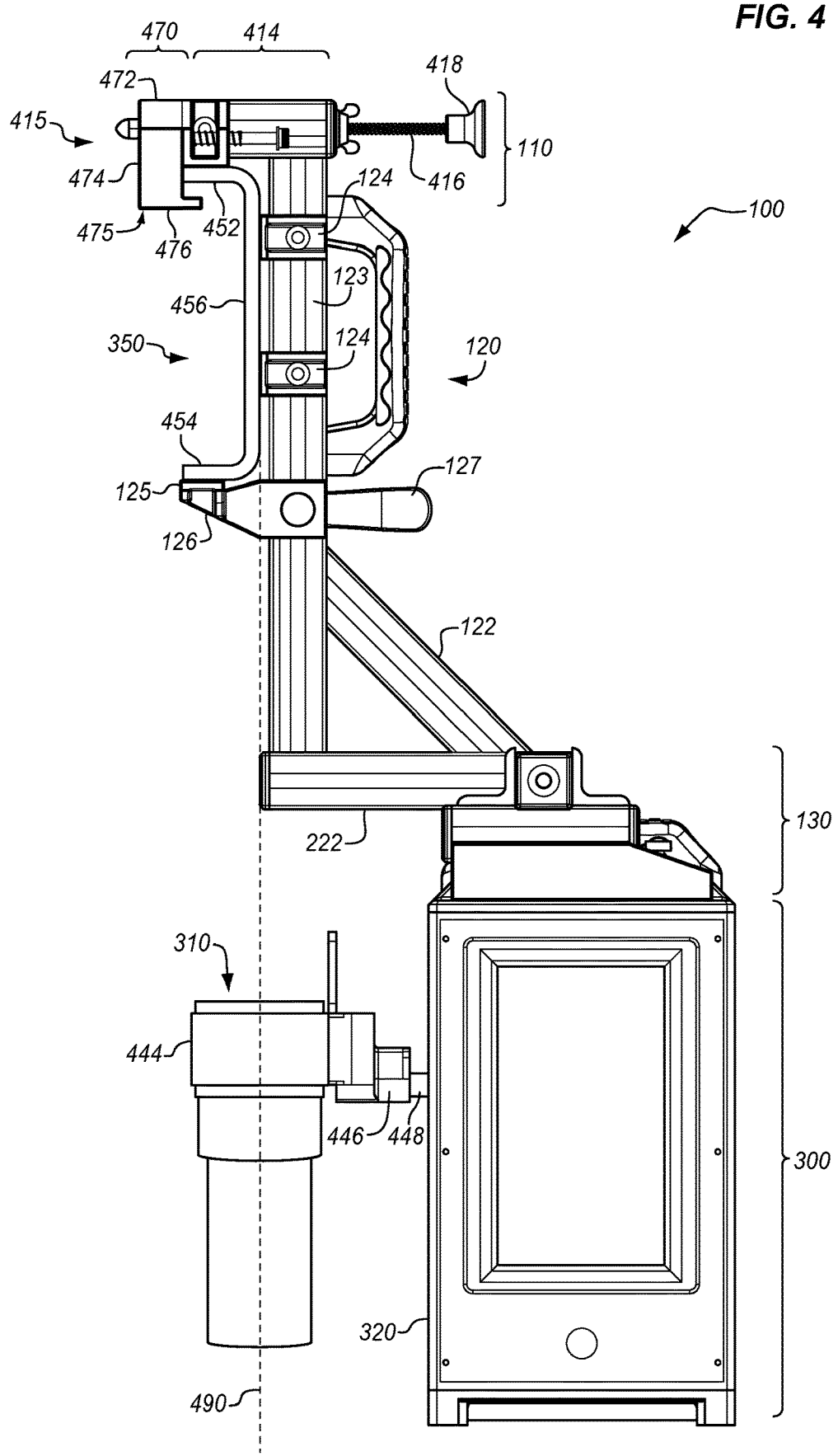
FIG. 4 is a side view of a hanging support bearing a load in an illustrative embodiment.
Figure 5:
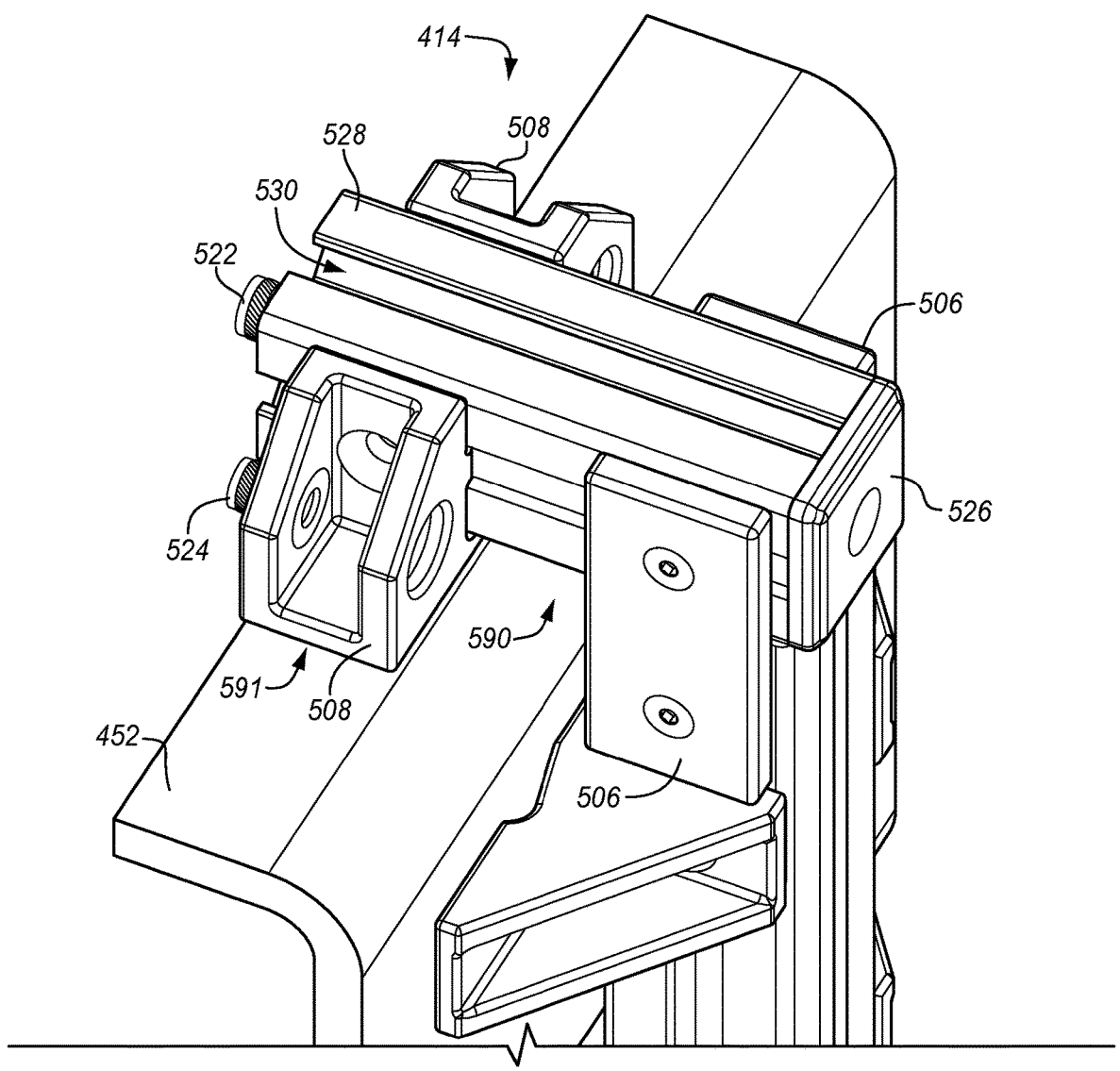
FIG. 5 is a perspective view of a first assembly of an adjustable clamp in an illustrative embodiment.
Figure 6:
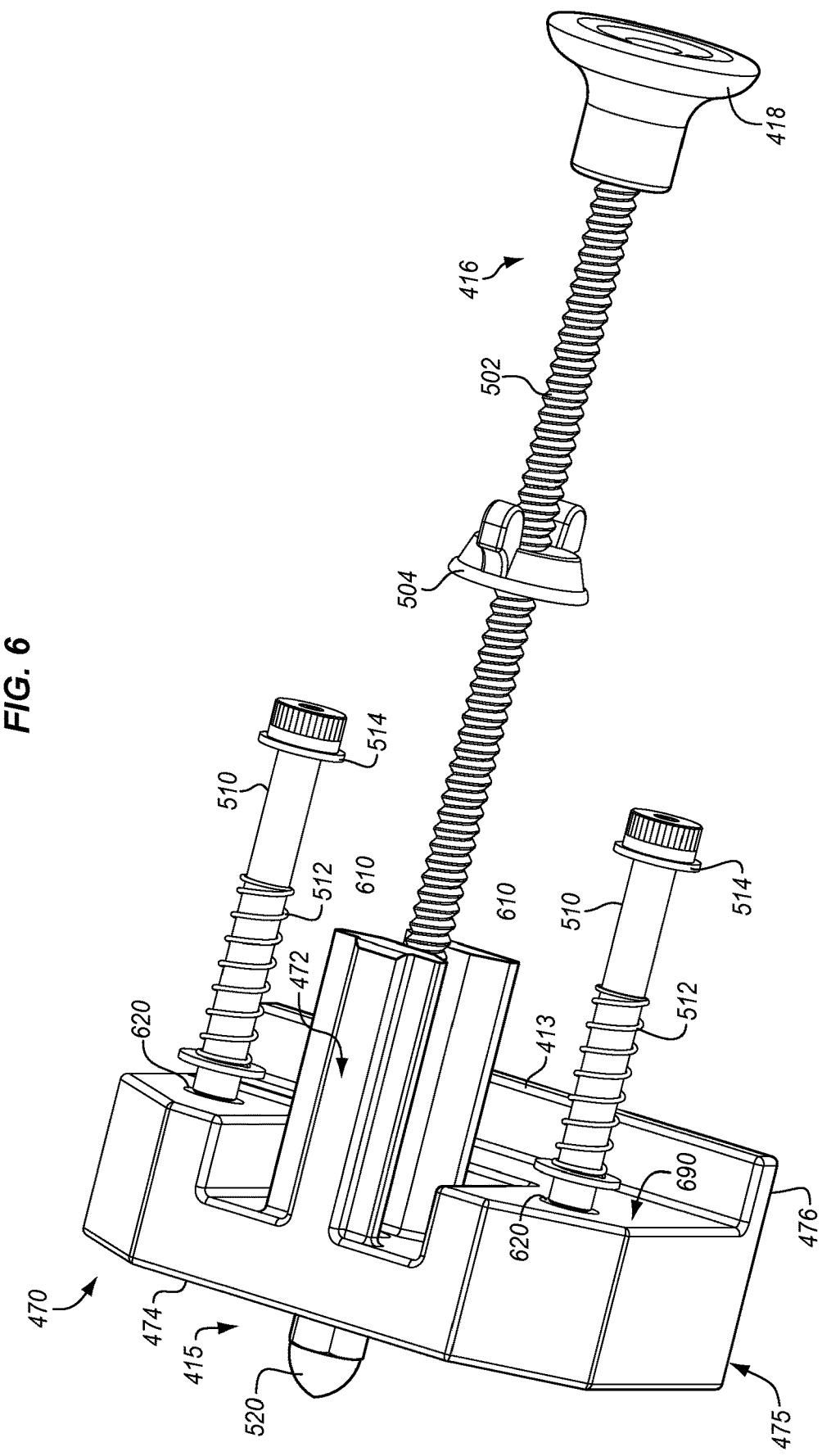
FIG. 6 is a perspective view of a second assembly of an adjustable clamp in an illustrative embodiment.

FIGS. 1-6 illustrate a hanging support 100 that hangs from a floor beam of an aircraft and bears an inspection system. Specifically, FIGS. 1-2 illustrate views of hanging support 100, FIGS. 3-4 illustrate views of hanging support 100 bearing a mounted inspection system 300 as a load, and FIGS. 5-6 illustrate components of adjustable clamp 110 of hanging support 100.

Turning to FIG. 1, FIG. 1 is a perspective view of hanging support 100 in an illustrative embodiment. In this embodiment, hanging support 100 includes adjustable clamp 110, which attaches to a floor beam or other portion of an airframe of an aircraft. Hanging support 100 further includes frame 120, and mount 130. Frame 120 protrudes vertically downward from the adjustable clamp 110, forming a right angle with adjustable clamp 110. Mount 130 protrudes vertically downward from frame 120 and applies torque to frame 120 when bearing a load such as an inspection system (e.g., inspection system 300 of FIG. 3).

Adjustable clamp 110 is designed to facilitate one-handed installation of hanging support 100 via handle 185, in order to enhance the safety of one or more technicians who may be placing hanging support 100 at various locations within an aircraft. Further details of adjustable clamp 110 are provided with respect to FIGS. 5-6.

Frame 120 includes multiple rigid members 122, 123, and 128 which are fixedly attached to each other. Rigid member 123 is vertically oriented, and is attached to adjustable clamp 110. Frame 120 further includes feet 124, which may contact a floor beam (e.g., floor beam 350 of FIG. 3) to which adjustable clamp 110 is attached. Feet 124 define rightward surfaces 192, which are parallel with rightward surface 191 of rigid member 123. In this embodiment, frame 120 further includes adjustable platform 125, which may be adjustably repositioned along rigid member 123 by loosening handles 127 and sliding support 126 upward or downward along slot 180. In this manner, handles 127 lock the adjustable platform 125 into place at frame 120. Adjustable platform 125 defines a horizontal surface 193.

Mount 130 is fixedly attached to frame 120, protrudes vertically downward, from frame 120, and includes feet 132 which define grooves 134 for receiving a load such as an inspection system that will hang from mount 130 and hence apply downward force to frame 120. Spring-loaded pull-out pins 138 snap into place on the load after the load has been inserted a desired distance into mount 130.

Further details of the features of hanging support 100 will be discussed with regard to FIG. 2. FIG. 2 is a front view of hanging support 100 indicated by view arrows 2 of FIG. 1. FIG. 2 shows that adjustable clamp 110 is affixed to upper portion 220 of frame 120, while mount 130 is affixed to lower portion 230 of frame 120. FIG. 2 also illustrates that feet 124 include rubberized pads 210, which may help to prevent swaying or other movement of hanging support 100 after hanging support 100 has been placed. Rubberized pads 210 may further prevent surface scratches at the floor beam. In further embodiments, all contact surfaces between the adjustable clamp 110 and the floor beam are rubberized. In FIG. 2, stop 139 has been illustrated as well. Stop 139 corresponds with a matching indent on a corresponding load attached to mount 130. Stop 139 prevents an inserted load from being over inserted or otherwise pushed out the other end of mount 130. With an introductory discussion provided regarding the components of hanging support 100, further description focuses upon hanging support 100 as utilized when bearing a load.

FIG. 3 is a perspective view of a hanging support in an illustrative embodiment. According to FIG. 3, hanging support 100 has been clamped onto floor beam 350, of which only a partial segment is shown. Hanging support 100 bears a mounted inspection system 300, which acquires images or other data utilized for inspecting an interior of an aircraft. For example, inspection system 300 may compare known locations of fasteners in the aircraft to expected locations of fasteners in the aircraft, in order to ensure that fasteners are placed within tolerance limits.

In this embodiment, inspection system 300 includes imaging system 310, and housing 320. Housing 320 may include a computer or other components for operating imaging system 310, and/or analyzing data provided by imaging system 310. Housing 320 includes projections 322 which correspond with grooves 134 of mount 130, allowing for slidable insertion of inspection system 300 into mount 130.

FIG. 4 is a side view of hanging support 100 bearing a load in an illustrative embodiment, and is indicated by view arrows 4 of FIG. 3. FIG. 4 illustrates that imaging system 310 includes camera 444, which is rotated by actuator 446 about shaft 448. This configuration allows camera 444 to image a full three hundred and sixty degree view of the interior (e.g., top-to-bottom) of the aircraft.

In this embodiment, centerline 490 of camera 444 is aligned with wall 456 of floor beam 350. Wall 456 is typically referred to as a "web." In further embodiments with floor beams having an "I", "J", "T", and/or "Z" cross section, centerline 490 may be aligned with any suitable Outer Mold Line (OML) of the floor beam. Upper lip 452 and lower lip 454 (i.e., an additional lip) of floor beam 350 are also illustrated. Adjustable platform 125 is pressed against lower lip 454, while adjustable clamp 110 is hooked around upper lip 452 and clamped to floor beam 350.

Adjustable clamp 110 also includes a handle 418, a rod 416, a first assembly 414, and a second assembly 470. Rod 416 extends horizontally through first assembly 414 and second assembly 470. Second assembly 470 includes a rigid part 415. Rigid part 415 includes an upper horizontal portion 472 that contacts first assembly 414 when adjustable clamp 110 is closed. Rigid part 415 also includes a vertical portion 474 that protrudes downwards from upper horizontal portion 472, and a lower horizontal portion 476 that protrudes horizontally (e.g., to the right) from a lower end 475 of vertical portion 474 towards first assembly 414. Rigid member 123 forms a right angle with adjustable clamp 110, and continues vertically below vertical portion 474 of rigid part 415. Further details of adjustable clamp 110 are provided with respect to FIGS. 5-6, which correspond with view arrows 5 of FIG. 3.

FIG. 5 is a perspective view of first assembly 414 of an adjustable clamp in an illustrative embodiment. In this embodiment, first assembly 414 is placed atop upper lip 452. Upper lip 452 may also be referred to as a flange of a C channel. First assembly 414 includes horizontal part 528, which is attached to rigid members 506 and plate 526. Slot 530 of horizontal part 528 is used to facilitate of sliding of second assembly 470 with respect to first assembly 414. Horizontal part 528 defines planar lower surface 590 that sits atop and contacts the upper lip 452. Planar lower surface 590 is parallel with and faces the horizontal surface 193 of adjustable platform 125.

First assembly 414 further includes feet 508, which protrude from the horizontal part 528 perpendicular to an axial direction of horizontal part 528. Feet 508 have lower surfaces 591 that are coplanar with the planar lower surface 590 of the horizontal part 528. Nut 524 is secured within rigid part 415 of second assembly 470.

FIG. 6 is a perspective view of a second assembly 470 of adjustable clamp 110 in an illustrative embodiment. FIG. 6 illustrates bolts 510 that slide within feet 508. A spring 512 is wrapped around each bolt 510, and is bordered by nut 524 on one end, and lip 514 on the other end. If bolts 510 slide too far to the left (e.g., because second assembly 470 has slid too far to the left), springs 512 apply force that slides bolts 510 back to the right. Also provided for context is handle 418, and rod 416 (which includes threading 502), and adjustable stop 504 (e.g., a wing nut). Nut 522 and cap 520 are fasteners that fasten rod 416 to second assembly 470.

According to FIG. 6, rigid part 415 is secured to rod 416 via cap 520 and nut 522 (which is hidden from view, but visible in FIG. 5). Receptacles 620 at rigid part 415 receive bolts 510, and secure the nuts 524 in place. This arrangement affixes the bolts 510 to second assembly 470. Thus, second assembly 470 is spring-loaded by springs 512. FIG. 6 further illustrates projections 610, which protrude from rigid part 415 into slot 530 of horizontal part 528, and slide within slot 530 as adjustable clamp 110 extends and retracts. Also illustrated is leftward surface 690 defined by vertical portion 474. Leftward surface 690 is parallel with and faces the rightward surface 191 defined by rigid member 123.

With an illustration provided of both first assembly 414 and second assembly 470, it will be understood that a technician may align adjustable clamp 110 with floor beam 350, then push on handle 185 of FIG. 1 to extend adjustable clamp 110. This action pushes second assembly 470 away from first assembly 414. The technician may then "hook" the lower horizontal portion 476 about upper lip 452, and release the handle 185, causing adjustable clamp 110 to retract and grip the floor beam 350. The technician may further adjust the location of adjustable stop 504 in order to prevent adjustable clamp 110 from extending, and slide platform 150 into contact with lower lip 454. In this manner, hanging support 100 becomes secured to floor beam 350.

Illustrative details of the operation of hanging support 100 will be discussed with regard to FIG. 7. Assume, for this embodiment, that a technician wishes to place inspection system 300 in position for inspecting an aircraft, but that no support has been placed for holding inspection system 300 in position.

Figure 7:
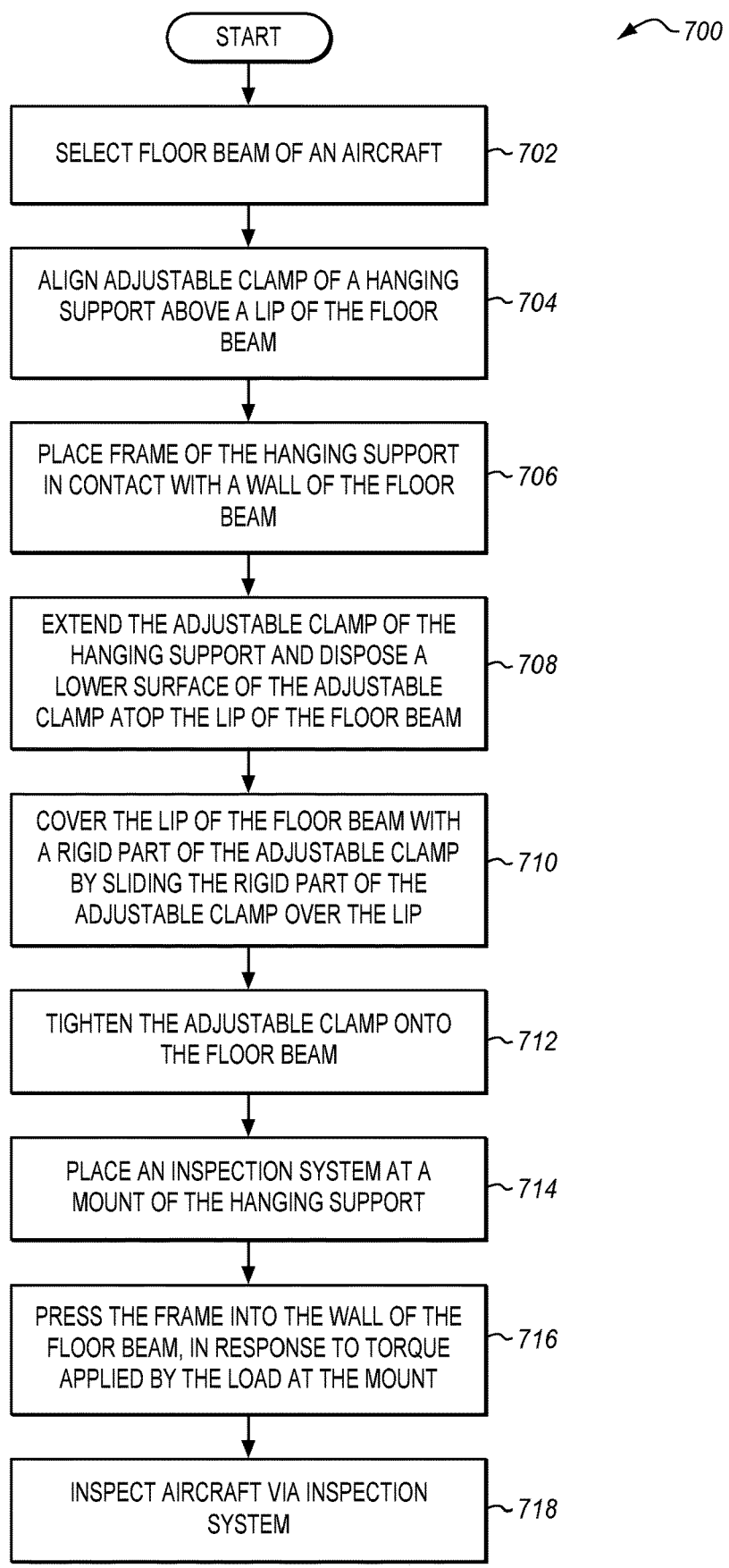
FIG. 7 is a flowchart illustrating a method for installing a hanging support in an illustrative embodiment.

FIG. 7 is a flowchart illustrating a method 700 for installing a hanging support in an illustrative embodiment. The steps of method 700 are described with reference to hanging support 100 of FIG. 1, but those skilled in the art will appreciate that method 700 may be performed in other systems. The steps of the flowcharts described herein are not all inclusive and may include other steps not shown. The steps described herein may also be performed in an alternative order.

A floor beam of the aircraft is selected (step 702). The floor beam may be selected based on a predefined plan, or may be dynamically determined. Hanging support 100 is then attached to lip 452 of the floor beam as described in steps 704-712 below. Adjustable clamp 110 of hanging support 100 is aligned with upper lip 452 of floor beam 350 (step 704). This alignment, may, for example, involve vertically positioning rigid part 415 over upper lip 452. Frame 120 of hanging support 100 is placed in contact with wall 456 of floor beam 350, for example by placing feet 124 of frame 120 against wall 456 (step 706).

With hanging support 100 in position, handle 185 is pushed, extending adjustable clamp 110 of hanging support 100 (step 708). This includes disposing a lower surface of adjustable clamp 110 atop upper lip 452 of floor beam 350. While adjustable clamp 110 is extended, second assembly 470 is pushed away from first assembly 414. This opens adjustable clamp 110 wide enough to cover upper lip 452 of floor beam 350 with rigid part 415 of adjustable clamp 110 (step 710). This may be performed by sliding rigid part 415 over upper lip 452. For example, lower horizontal portion 476 may be hooked around upper lip 452, securing hanging support 100 in place. Adjustable clamp 110 is then tightened onto floor beam 350 (step 712). For example, handle 185 may be released in order to retract second assembly 470, and/or adjustable stop 504 may be threaded into place to prevent adjustable clamp 110 from extending again. A load (e.g., inspection system 300) is placed at mount 130 of hanging support 100 (step 714). Mount 130 protrudes from rigid member 123 of frame 120 in a horizontal direction. This design feature causes a load (e.g., inspection system 300) at mount 130 to apply torque that presses frame 120 into wall 456 of floor beam 350 (step 716). The aircraft is then inspected via inspection system 300 (step 718).

Method 700 provides a number of advantages over prior placement and installation techniques for inspection systems. First, the unique geometry of adjustable clamp 110 allows for a technician to perform a one-handed installation of hanging support 100. This ensures that if a technician is using a ladder during installation of hanging support 100, the technician still has a hand free in order to provide personal balance and stability.

Second, hanging support 100 itself has a unique geometry which causes application of a load at mount 130 to enhance the stability of hanging support 100, by providing torque that presses frame 120 firmly into floor beam 350.

Figure 8:
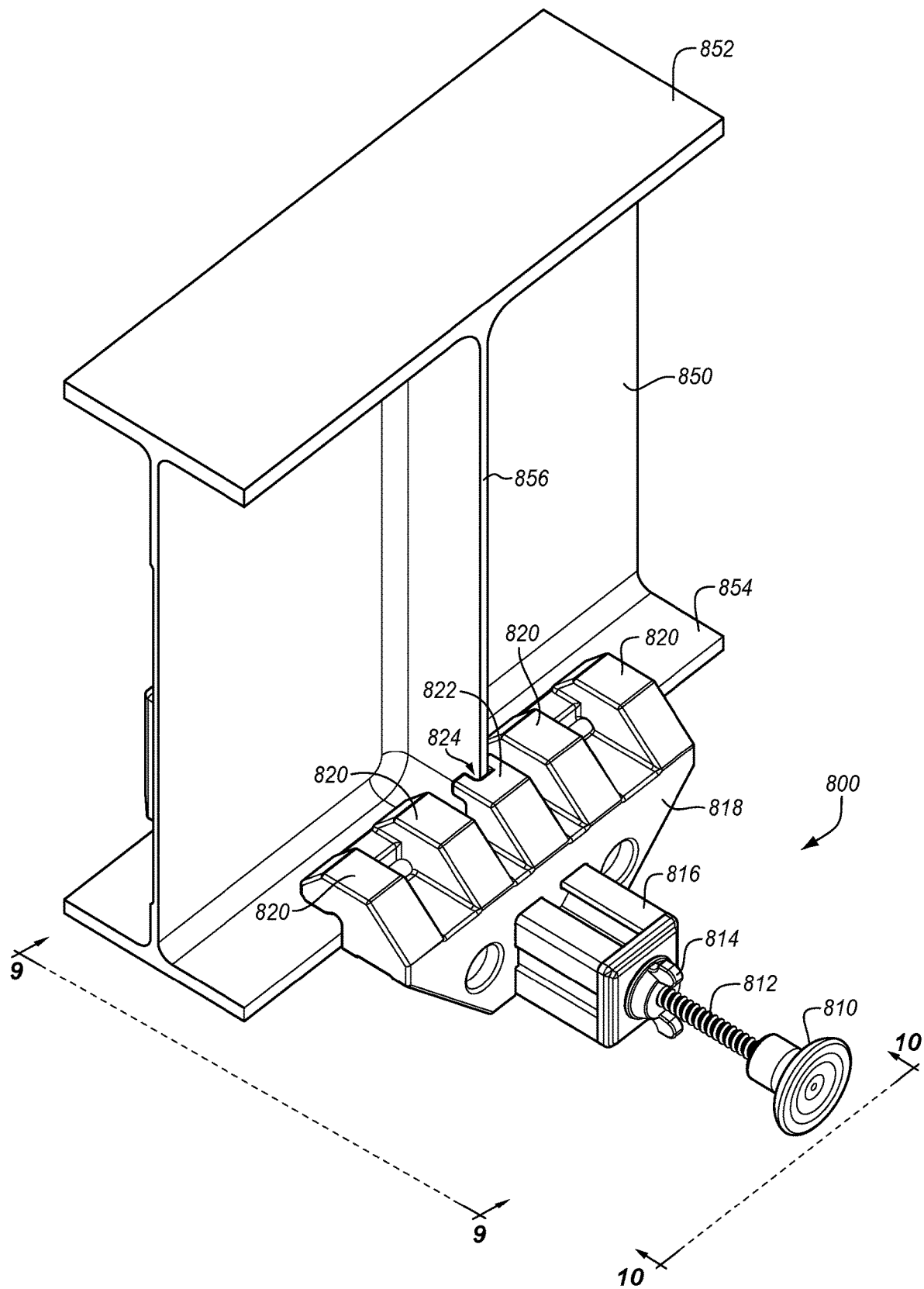
FIG. 8 is a perspective view of a further adjustable clamp in an illustrative embodiment.
Figure 9:
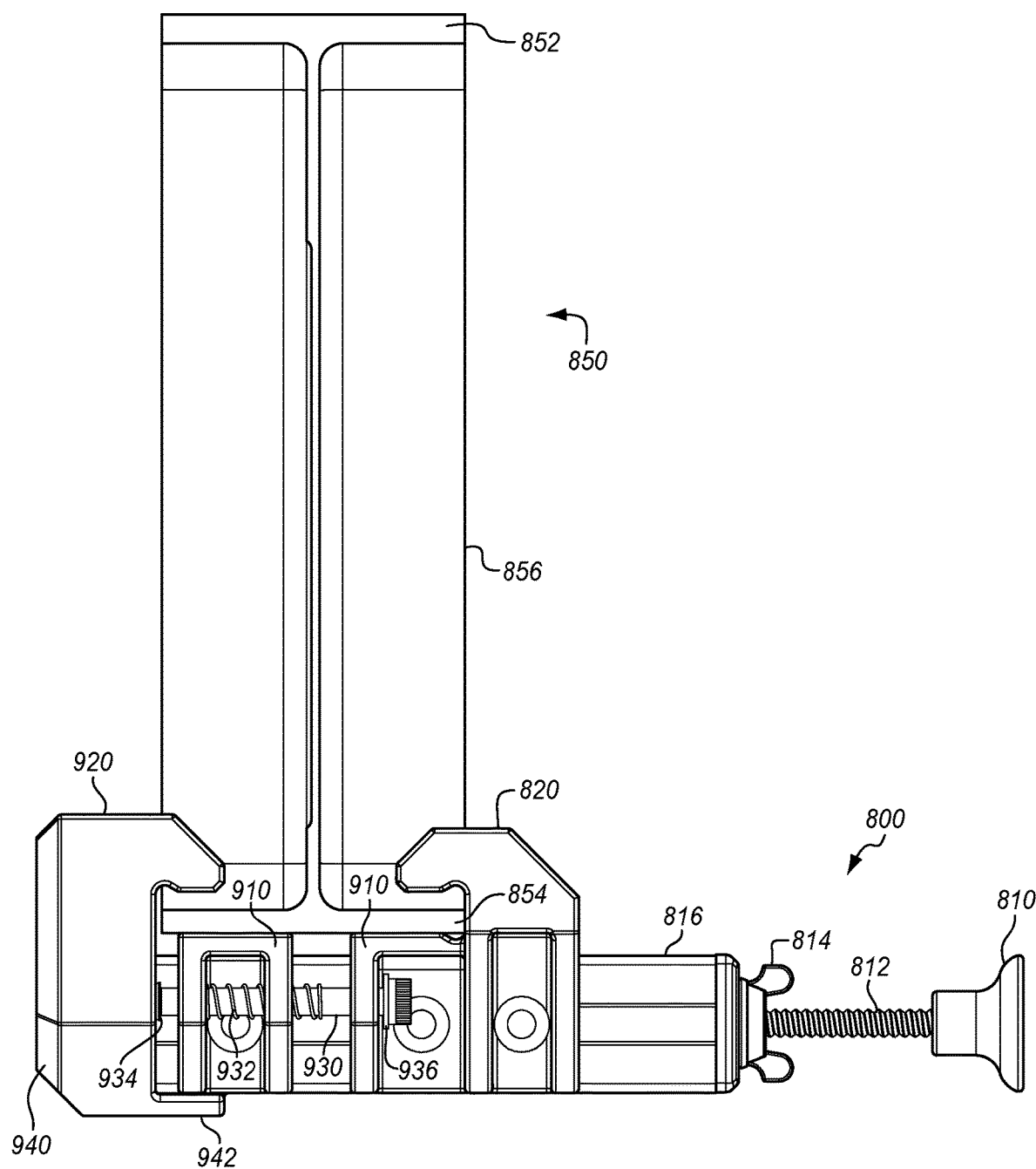
FIG. 9 is a side view of an adjustable clamp in an illustrative embodiment.
Figure 10:
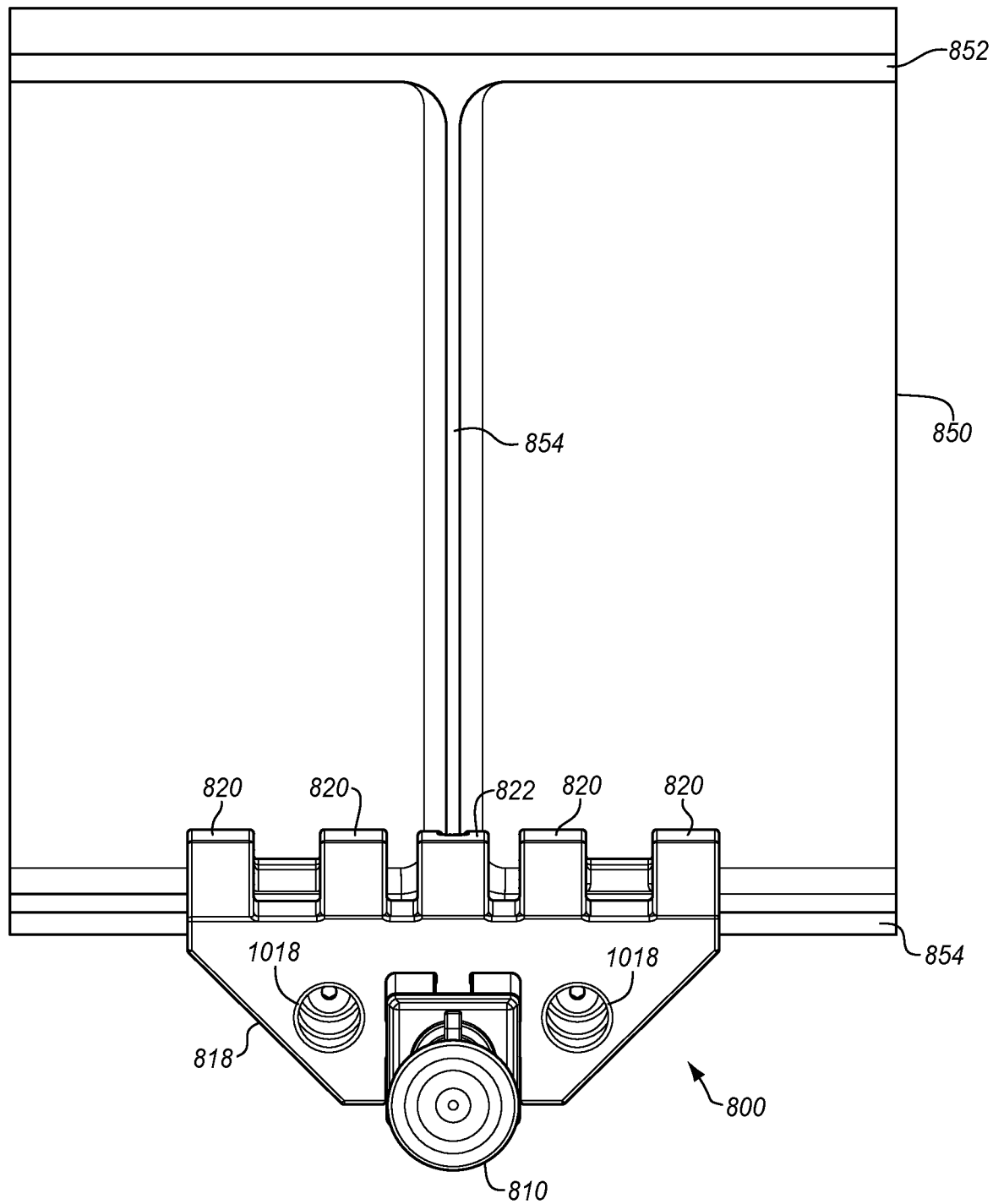
FIG. 10 is a back view of an adjustable clamp in an illustrative embodiment.

FIGS. 8-10 illustrate a further illustrative embodiment of an adjustable clamp 800 which may be utilized by hanging support 100. Specifically, FIGS. 8-10 illustrate an adjustable clamp 800 that may be clamped to a lower lip of a floor beam 850 having an "I" shaped cross-section instead of a "C" shaped cross-section.

FIG. 8 is a perspective view of adjustable clamp 800. According to FIG. 8, adjustable clamp 800 includes handle 810, and rod 812 (which is threaded), along with adjustable stop 814. Rod 812 continues through rigid part 816, and through rigid part 818. In this embodiment, rigid part 818 includes multiple prongs 820, as well as a central prong 822 which includes a cut-out 824. Adjustable clamp 800 is presently clamped to floor beam 850, which includes upper lip 852, lower lip 854, and rib 856.

FIG. 9 is a side of view the adjustable clamp 800, and corresponds with view arrows 9 of FIG. 8. According to FIG. 9, adjustable clamp 800 further includes feet 910, via which bolt 930 slides. Bolt 930 includes lip 936, which acts as a stop for spring 932. Feet 910 are fixedly attached to rigid part 816. However, rigid part 940 is only connected to bolt 930 (via receptacle 934), as well as rod 812 (via a fastener, not shown). Thus, rigid part 940 may be extended away from rigid part 818 by pressing handle 810. In this embodiment, rigid part 940 includes prongs 920 (e.g., upper horizontal portions), as well as lower horizontal portion 942. Lower horizontal portion 942 protrudes towards rigid part 818.

FIG. 10 is a front view of adjustable clamp 800, and corresponds with view arrows 10 of FIG. 8. This view illustrates that rigid part 818 includes holes via which bolts 930 may travel.

EXAMPLES

In the following examples, additional processes, systems, and methods are described in the context of an adjustable hanging support.

Figure 11:
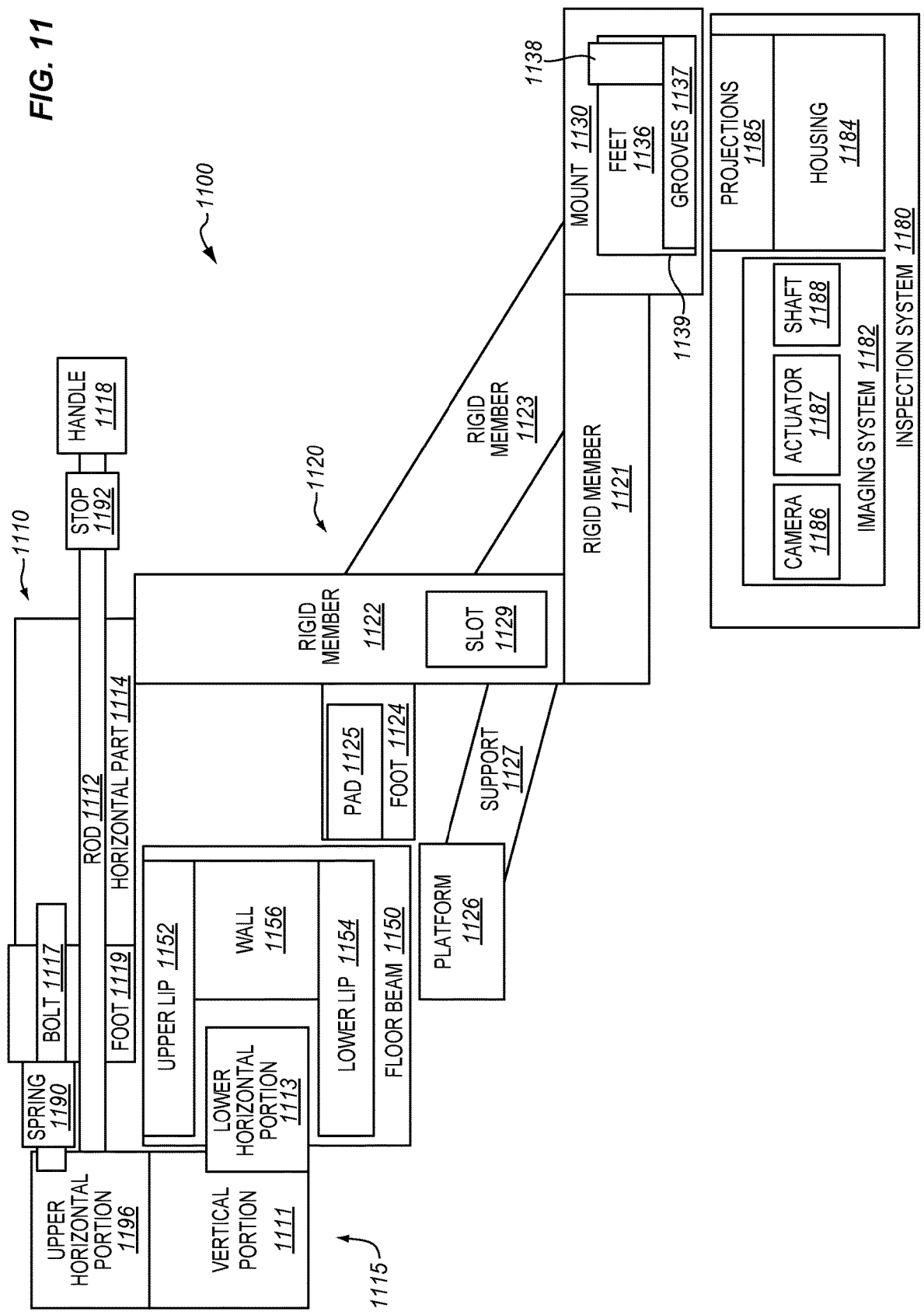
FIG. 11 is a block diagram of a hanging support holding an inspection system in an illustrative embodiment.

FIG. 11 is a block diagram of a hanging support 1100 holding an inspection system in an illustrative embodiment. According to FIG. 11, hanging support 1100 includes clamp 1110, frame 1120, and mount 1130. Clamp 1110 includes horizontal part 1114, which contacts wall 1156 of floor beam 1150. Foot 1119 is attached to horizontal part 1114, and contacts the upper lip 1152 of floor beam 1150. A position of rod 1112 is controlled by handle 1118 and stop 1192, which enables rigid part 1115 to be displaced with respect to the rest of clamp 1110. Bolt 1117 is coupled to upper horizontal portion 1196 of rigid part 1115, and spring 1190 returns the rigid part 1115 to a default position when no force is applied. Lower horizontal portion 1113 projects outward from vertical portion body 1111 toward frame 1120, and is wrapped around upper lip 1152.

Frame 1120 includes rigid member 1121, rigid member 1122, and rigid member 1123. Foot 1124 extends from rigid member 1122, and pad 1125 of foot 1124 contacts wall 1156 of floor beam 1150. Support 1127 adjustably slides at slot 1129, and holds platform 1126 in place. Platform 1126 contacts lower lip 1154 of floor beam 1150, further strengthening the grip of hanging support 1100 at floor beam 1150.

Mount 1130 includes feet 1136, which define grooves 1137. Spring-loaded pull-out pins are also provided at mount 1130 to hold inspection system 1180 in position. Furthermore, a stop 1139 is provided at mount 1130 to prevent over-insertion of inspection system 1180.

In this embodiment, inspection system 1180 includes projections 1185, which extend from housing 1184 and mate with grooves 1137. Inspection system 1180 further includes inspection system 1182, which inspects the interior of an aircraft. In this embodiment, inspection system 1182 includes camera 1186, and actuator 1187 which rotates camera 1186 about shaft 1188.

Figure 12:
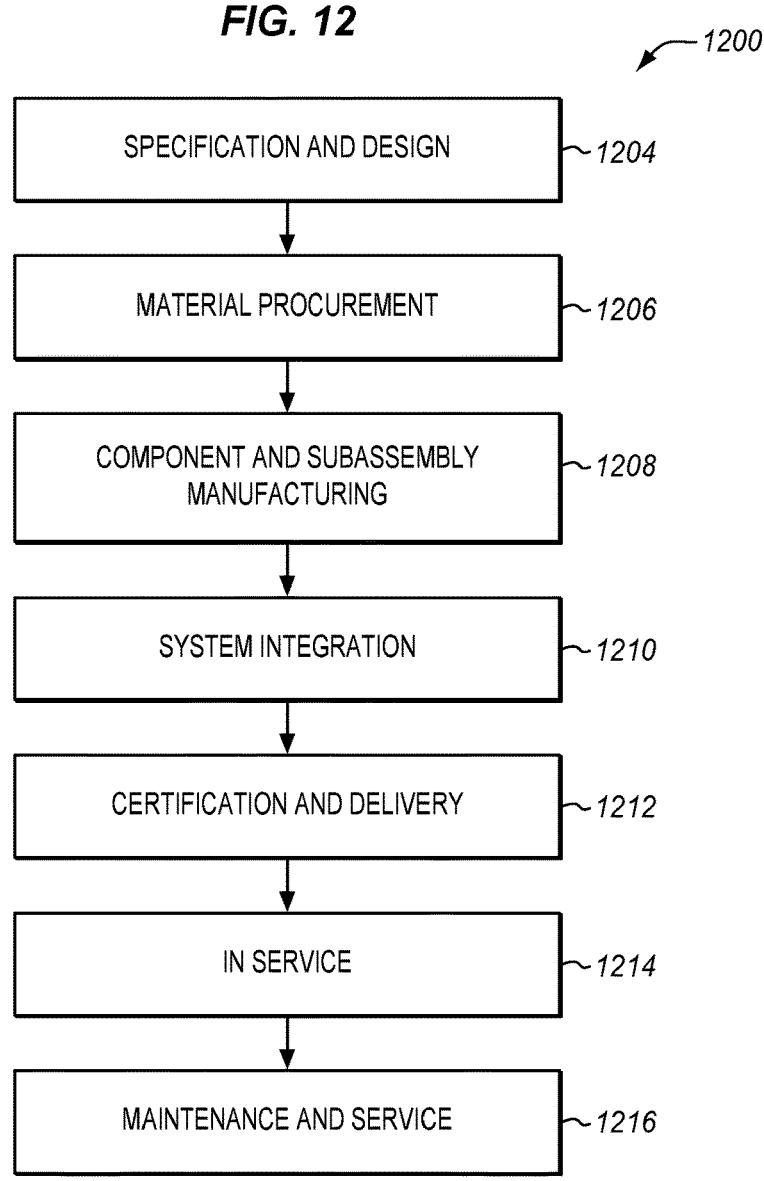
FIG. 12 is a flow diagram of aircraft production and service methodology in an illustrative embodiment.
Figure 13:
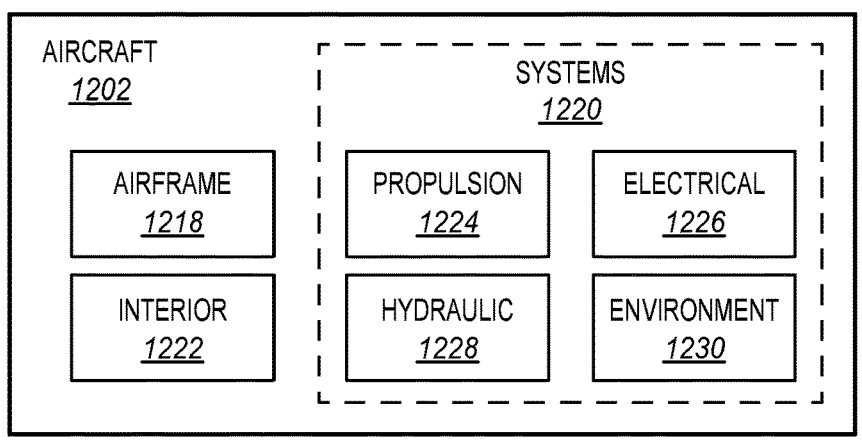
FIG. 13 is a block diagram of an aircraft in an illustrative embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, illustrative method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on). Apparatus and methods embodied herein may be employed during any one or more suitable stages of the production and service method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion 1224, electrical 1226, hydraulic 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by illustrative method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 1224, electrical 1226, hydraulic 1228, and/or environmental 1230.

In one embodiment, an inspection system 300 is held by hanging support 100 and is utilized to analyze airframe 1218 before or after component and subassembly manufacturing 1208, or system integration 1210. Hanging support 100 may support inspection system 300 during this process. The airframe 1218 may then be utilized in service 1214. Then, in maintenance and service 1216, hanging support 100 may again be used to hold an inspection system 300 in place. Inventive components and methods may be utilized throughout component and subassembly manufacturing 1208 in order to inspect various structural components of aircraft 1202.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method comprising:
selecting a floor beam of an aircraft;
attaching a hanging support to the floor beam, comprising:
aligning an adjustable clamp of the hanging support above a lip of the floor beam, while placing a frame of the hanging support into contact with a wall of the floor beam that proceeds vertically downwards;
tightening the adjustable clamp onto the floor beam by sliding a rigid part of the adjustable clamp horizontally over the lip of the floor beam that defines a topmost portion of the floor beam; and
placing an inspection system at a mount of the hanging support.

2. The method of claim 1 wherein:
the mount is horizontally offset from the adjustable clamp of the hanging support.

3. The method of claim 1 wherein:
placing the inspection system at the mount comprises sliding the inspection system into grooves at the mount.

4. The method of claim 1 further comprising:
driving spring loaded pins from the mount into the inspection system after the inspection system has been placed at the mount.

5. The method of claim 1 further comprising:
sliding an adjustable platform vertically along the hanging support, causing a horizontal surface of the adjustable platform to contact an additional lip of the floor beam.

6. The method of claim 1 wherein:
placing the inspection system at the mount comprises aligning a camera of the inspection system with a wall of the floor beam.

7. The method of claim 1 wherein:
the lip is a flange of a C channel.

8. The method of claim 1 further comprising:
selecting the floor beam based on a predefined plan.

9. The method of claim 1 further comprising:
imaging a three hundred and sixty degree view of the aircraft via the inspection system.

10. The method of claim 1 wherein:
operating the inspection system to compare known locations of fasteners in the aircraft to expected locations of fasteners in the aircraft.

11. The method of claim 1 wherein:
attaching the hanging support to the floor beam further comprises:
extending the adjustable clamp of the hanging support; and
covering the lip of the floor beam with a horizontal part of the adjustable clamp by disposing a lower surface of the adjustable clamp atop the lip of the floor beam.

12. The method of claim 11 wherein:
extending the adjustable clamp comprises pushing a spring-loaded assembly of the clamp away from a frame of the hanging support.

13. The method of claim 1 further comprising:
inspecting the aircraft via the inspection system.

14. The method of claim 13 wherein:
inspecting the aircraft comprises imaging the aircraft via a camera.

15. The method of claim 1 further comprising:
threading an adjustable stop that prevents the adjustable clamp from extending.

16. The method of claim 15 wherein:
the adjustable stop comprises a wing nut.

17. The method of claim 1 further comprising:
rotating a camera of the inspection system.

18. The method of claim 17 wherein:
rotating the camera is performed by an actuator.

19. The method of claim 17 further comprising:
aligning a centerline of the camera with a wall of the floor beam.

20. The method of claim 17 wherein:
rotating the camera comprises rotating the camera about a shaft.

* * * * *